March 25, 1930.  G. L. SMITH  1,752,209
BRAKE SYSTEM
Filed March 15, 1926
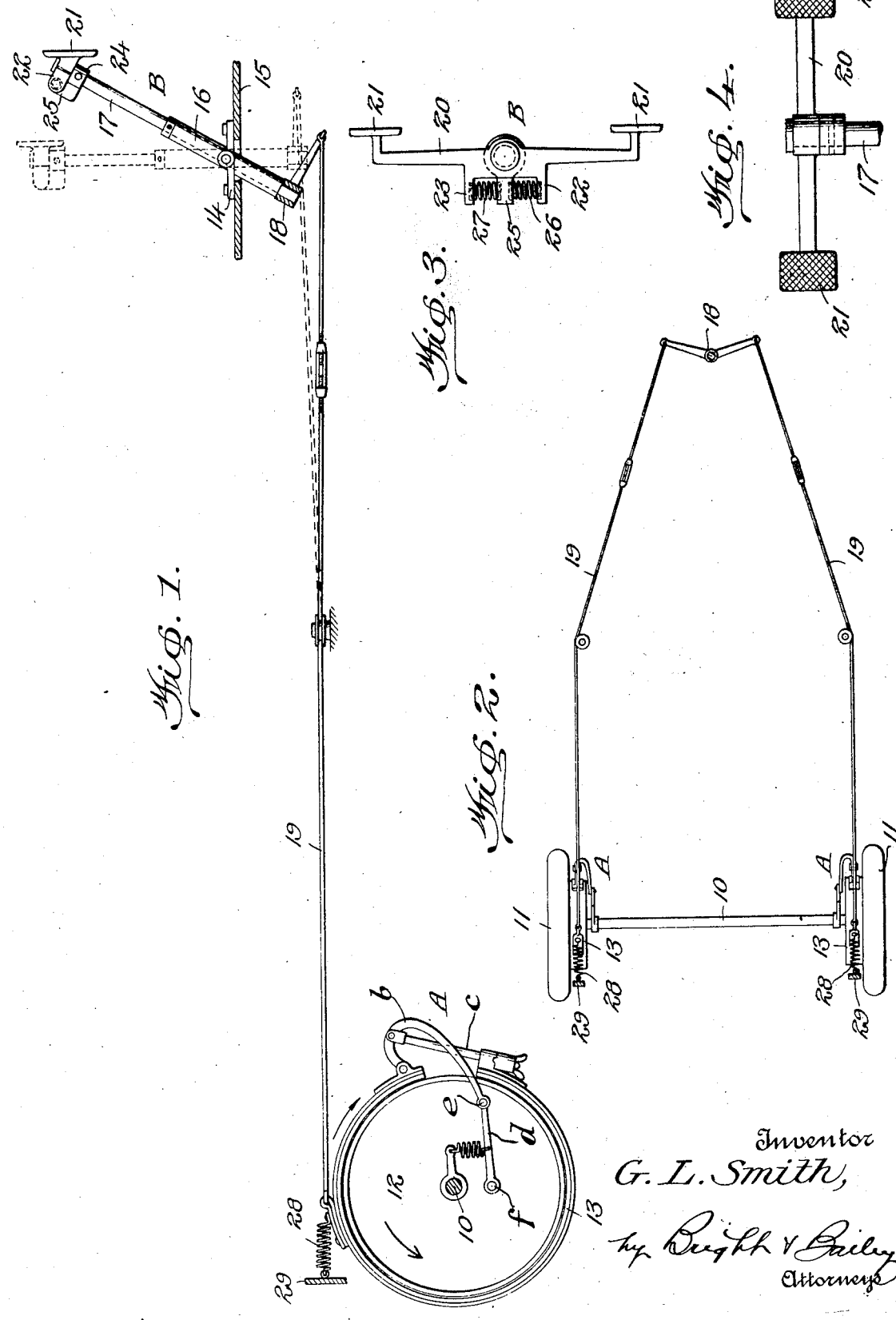
Inventor
G. L. Smith, Patented Mar. 25, 1930

1,752,209

UNITED STATES PATENT OFFICE

GEORGE L. SMITH, OF WASHINGTON, DISTRICT OF COLUMBIA, ASSIGNOR TO UNITED STATES ORDNANCE COMPANY, OF WASHINGTON, DISTRICT OF COLUMBIA, A CORPORATION OF VIRGINIA

BRAKE SYSTEM

Application filed March 15, 1926. Serial No. 94,881.

My invention relates to brake systems, and particularly to controlling a pair of brakes whose braking effects are equalized in the manner disclosed in my Patent 1,440,842, January 2, 1923, in which the braking action delivered by the wheels to the road is balanced regardless of variations in the brake or tire friction.

When my method of equalizing the braking effects of a pair of brakes is applied to automobiles it is desirable to provide as nearly as possible perfect equalization of braking effects, but there are other purposes for which a mechanism for effecting this method of equalization may be used, such as the control of brakes on aeroplane wheels. In this latter use it is desirable to vary the braking effect of one brake with respect to the braking effect of the other at the will of the aviator, so that either brake may be compelled to exert a greater braking effect than the other to thereby make it possible for the aviator to steer his plane after landing by means of the brakes. Since the brake force set up by the application of a pair of brakes equalized as outlined in my aforesaid patent reacts upon the anchoring mechanism interconnecting the two brakes it is manifest that any interference with the movement of this mechanism or a change in its leverage would effect a variation in its accuracy of equalization. For example should a device be applied to my equalizer rod as shown in the aforesaid patent in such a manner as to produce a force pushing this rod to one side or the other, then the balance of the two brake forces would be upset to a degree dependent upon the magnitude of the force pushing the rod over. Or, the same effect may be obtained by a mechanism producing a change of the lever arms of the two-bell-cranks shown, in which case the pull of the equalizer rod would be more effective on one side than the other and thereby produce a greater brake force on that side dependent in degree upon the amount of the increase in leverage for that side.

As the former method, that of applying an arresting force to the equalizing connections, is more easily understood, I will describe in detail how this method may be applied to produce a controlled variation in the accuracy of equalization for the purpose above set forth. Furthermore, I desire to produce this variation through the equalizing mechanism rather than through the brake setting mechanism as the former automatically produces a balance of braking effects, whereas the latter does not, consequently the production of an unbalanced braking effect through the equalizing mechanism will always be applied from the starting point of a perfect balance requiring no correction for variations in the brake or tire friction.

In addition I desire to apply this arresting force through a yielding means such as a spring, so that movement of the equalizing mechanism will be permitted to neutralize any temporary changes in brake effects produced by sudden changes in the brake or tire friction or tire pressure. In this way rapid and reverse movements of the equalizing mechanism will still go on and the change from a balanced to an unbalanced condition will be the result of the mean arresting force applied through this yielding means.

Still another purpose of my invention is to produce a brake mechanism in which the braking effect resulting from any applying force exerted by the operator will be substantially proportional to such force regardless of variations in the co-efficient of friction of the braking surfaces. To accomplish this result I employ a construction whereby the brake is applied by a movement of the brake anchoring means.

In describing my invention in detail reference will be had to the accompanying drawing wherein like characters of reference denote corresponding parts in the several views, and in which Figure 1 is a vertical section of a brake system of an aeroplane embodying my invention;

Figure 2, a plan view partly in section of said system;

Figure 3, a plan view of the cross arm of the operator which carries the foot pads; and Figure 4, a view in elevation of what is shown in Figure 3.

In the drawings 10 indicates the axle of an aeroplane on which are rotatably mounted the usual wheels 11. Each of these wheels has fixed thereto a brake drum 12 and extending about said drum is a brake band 13 capable of rotary movement in either direction with respect to the drum, this rotary movement being provided for in order that the braking effects of the two brakes may be equalized by the method disclosed in my aforesaid Patent 1,440,842. The ends of each band 13 are connected by a band contracting and expanding mechanism A consisting of a lever $b$, a tension bolt $c$ and a link $d$, this link being pivoted at $e$ to the lever $b$ and at $f$ to a fixed part of the axle at a distance from its center. It is evident that rotation of the brake band and mechanism A in the direction of the arrow (or clockwise in Fig. 1) will cause the link $d$ to rotate about its fixed pivot $f$ swinging the pivot $e$ down and away from the center of axle 10, thereby forcing out the lever $b$ and operating the tension bolt $c$ to contract the band around the drum. Rotation in the opposite direction manifestly releases the band from its drum.

In the construction shown, which is merely illustrative of one method of carrying my present invention into practice, there is embodied a foot controlled brake operating device B. This device comprises a bracket 14 secured to a fixed part 15 of an aeroplane. Passing through an opening in this bracket and pivoted to the latter for movement in the vertical longitudinal plane of the aeroplane is a tubular lever 16. Rotatably mounted in the bore of this lever is a shaft 17 which has fixed on its lower end a two arm rocker 18. Brake operating connections 19 lead from respective ends of this rocker and have corresponding ends anchored to respective bands at a point intermediate the ends of said bands. These wires 19 and rocker 18 constitute a mechanism for equalizing the pull of the brake bands and thereby the braking effects, since the rocker 18, if free to rotate, would swing one way or the other until the tension in the two wires 19 was the same. In my aforesaid Patent #1,440,842, this action is produced by two bell-cranks and an equalizer rod connecting them. Rotatable on the upper end of the shaft 17 is another two arm rocker 20 which carries on respective ends foot pads 21. Extending forwardly from the rocker 20, on opposite sides of and equidistant from the axis of rotation of the shaft 17, are extensions 22 and 23 for a purpose that will presently appear. Fixed to the shaft 17 just beneath the rocker 20 is a bracket 24 which has an upwardly extending portion 25 located between the extensions 22 and 23. Between the portion 25 and extension 22 I interpose a spring 26, while a corresponding spring 27 of equal strength is interposed between said portion 25 and extension 23. These springs are under a predetermined initial compression. From this construction it will be obvious that the springs 26 and 27 complete the connection between rocker 20 and shaft 17 and yieldingly resist rotation of the shaft 17 when a greater force is applied to one of the pads 21 than to the other. To normally maintain the bands 13 expanded or released with respect to their related drums I connect to each band one end of a tension spring 28, while the other end of said spring is anchored to a fixed part 29 of an aeroplane.

As a result of the construction heretofore described it will be apparent that if the aviator swings the lever 17 by equal foot pressure on the two pads 21 to the dotted line position in Fig. 1 the effect will be to pull on the two wires 19 and rotate the bands 13 in the direction of the arrow (or clockwise). This, as previously explained, causes the mechanism A to contract the bands about their respective drums. Now the rocker 18 is not rigidly held against rotation as the springs 26 and 27 form the connection between it and the rocker 20, therefore the rocker 18 will swing until the tension in the right wire 19 balances that of the left wire 19. This swinging action involves a slackening of one wire and a pulling in of the other which results in oppositely directed rotary movements of the brake bands. This rotary movement in turn changes the brake pressures on the two sides through the action of the mechanism A as previously explained, so that as a head movement of the plane involves rotary movement of the drums in a counter-clockwise direction, or to the left in Fig. 1, it is manifest that the brake pulling the harder will rotate in this counterclockwise direction and its pressure will be slackened, the opposite brake, the weaker one, at the same time being rotated in a clockwise direction and its pressure will be increased, this action continuing until the two braking effects are balanced and the movement stops. Thus the aviator by equal pressure on the two pads 21 applies his brakes and does not interfere with the slight rotary movement of the rocker 18 as necessary to equalize the braking effects of his brakes.

If he does not exert equal pressure on these two pads he will impart a rotary force to the rocker 18 which will be transmitted through the springs 26 or 27 and the result will be that the tension in the two wires 19 will not be the same but unequal to a degree dependent upon the amount of unbalanced force the aviator exerts. Therefore, the balance of braking effects will be upset and one brake will exert a greater retarding force than the other, so that the plane will travel in a curved path, its direction and degree of curvature being under the control of the aviator.

In the claims the term "braking effect" is used to describe the actual retarding force which a braked wheel exerts on the ground. This may or may not correspond to the brake force as it is not only dependent upon this force, but also upon the adhesion or holding power of the tire on the ground. For instance, if this adhesion is low the brake force may be sufficient to lock the wheel and any further brake force applied would be ineffectual to increase this "braking effect."

In explanation of the expressions "brake anchoring mechanism" and "brake anchoring means" as used in claims 5, 6, 9, 12 and 13, it is pointed out that the defined structure embodies the wires 19 and the connections between said wires and the foot pads 21, it being apparent that when such mechanism is operated to apply the brakes by pressing on either or both of the pads 21, it also acts to hold the brake bands against rotation with their related drums and thus constitutes a brake anchoring mechanism. In other words, the wires 19 and the connections between the latter and the foot pads 21 serve both to apply and anchor the brakes. While I have referred in this explanation to the detail construction shown in the drawings it should be distinctly understood that the expressions "brake anchoring mechanism" and "brake anchoring means" included in the claims previously specified is in no way limited to such detail arrangement and is intended to include any structure producing substantially the same result.

I claim:

1. The combination with a brake equalizing mechanism for equalizing the braking effects of a pair of brakes, of means whereby said mechanism may be operated to effect inequality between said braking effects.

2. The combination with a brake equalizing mechanism for equalizing the braking effects of a pair of brakes, of means whereby said mechanism may be operated to effect selective increase of either braking effect over the other.

3. The combination with a mechanism for equalizing the braking effects of a pair of brakes, of means for operating said mechanism to effect selective increase of either braking effect over the other proportional to the operating force applied.

4. The combination with a brake equalizing mechanism for equalizing the braking effects of a pair of brakes, of means whereby said mechanism may be operated to effect inequality between said braking effects, said means during its operation yieldingly resisting operation of the equalizer.

5. In a brake system, a brake, a brake pressure producing mechanism for the brake, and a brake anchoring mechanism operable through said pressure producing mechanism to apply the brake.

6. In a brake system, a pair of friction brakes, and brake control mechanism connecting said pair of brakes for selectively varying the braking effects of said brakes regardless of variations in their frictional characteristics.

7. In a brake system, a brake, a brake pressure producing mechanism for the brake, and a brake anchoring mechanism for anchoring said brake and operating said pressure producing mechanism to apply said brake.

8. In a brake system, a pair of brakes, a brake pressure producing mechanism for each of said pair of brakes, and a brake anchoring mechanism for anchoring said brakes and operating said pressure producing mechanism to apply said brakes, said anchoring mechanism coacting with said pressure producing mechanism to control the braking effects of said brakes when applied.

9. The combination with a pair of brakes, of mechanism automatically operable to maintain an invariable ratio between the braking effects of said brakes, and means connected to said mechanism manually operable to vary said ratio.

10. In a brake system, a brake having two rotary movements, means operated by one rotary movement to produce braking pressure of said brake and by the other rotary movement to release said braking pressure, and means for manually producing the first named rotary movement.

11. In a brake system, a pair of brakes each having two rotary movements, brake applying mechanisms operated by one rotary movement of each brake to produce braking pressure and by the other rotary movement to release said braking pressure, and a brake anchoring mechanism operable to produce the first named rotary movement of each brake, said mechanism permitting oppositely directed rotary movements of the two brakes when applied.

12. In a brake system, a pair of brakes each having two rotary movements, means operated by one rotary movement of each brake to increase its braking pressure and by the other rotary movement to decrease said braking pressure, and mechanism for producing the first named rotary movement of each brake, said mechanism being operable to produce oppositely directed rotary movement of said brakes when exerting braking pressure.

13. In a brake system, a pair of brakes, a pressure applying mechanism associated with each brake, an axially rotatable brake operator, and brake anchoring means between each brake and the operator effective, when the operator is rotated axially, to operate one pressure applying mechanism while the other pressure applying mechanism remains inactive.

14. In a brake operating mechanism for a pair of brakes, an operating lever, a mounting for said lever permitting the same to rotate about an axis substantially in the direction of its length and to swing about a fixed pivot point, a yoke on one end of said lever, operating connections from the ends of said yoke to the brakes and a cross member on the other end of said lever for manually rotating the lever about said axis and swinging it about said pivot point.

15. In a brake system, a brake drum, a friction brake element for engaging said drum, means for applying said element to said drum, mechanism anchoring said element and operating said means and cooperating with said means to produce a braking effect substantially independent of variations in the frictional characteristics of said element.

In testimony whereof I hereunto affix my signature.

GEORGE L. SMITH.